(12) United States Patent
Marchetto (10) Patent No.: US 7,428,243 B2
(45) Date of Patent: Sep. 23, 2008

(54) METHOD AND SYSTEM FOR VARYING DATA PACKET SIZE FOR CONTROLLING BANDWIDTH

(75) Inventor: Jarno Marchetto, Genestrerio (CH)

(73) Assignee: Darby & Mohaine, LLC, Wilmington, DE (US)

( * ) Notice: Subject to any disclaimer, the term of this patent is extended or adjusted under 35 U.S.C. 154(b) by 855 days.

(21) Appl. No.: 10/273,545

(22) Filed: Oct. 18, 2002

(65) Prior Publication Data

US 2004/0076173 A1 Apr. 22, 2004

(51) Int. Cl.
*H04J 3/16* (2006.01)
*H04J 3/22* (2006.01)
*H04J 3/00* (2006.01)

(52) U.S. Cl. ............................ 370/468; 370/476
(58) Field of Classification Search ............ 370/465, 370/468, 476, 229, 235
See application file for complete search history.

(56) References Cited

U.S. PATENT DOCUMENTS

| 4,771,391 | A | 9/1988 | Blasbalg | |
|---|---|---|---|---|
| 5,982,778 | A | 11/1999 | Mangin et al. | |
| 6,118,787 | A | 9/2000 | Kalkunte et al. | 370/445 |
| 6,144,637 | A | 11/2000 | Calvignac et al. | 370/229 |
| 6,198,743 | B1 | 3/2001 | Giroux et al. | 370/395 |
| 6,215,767 | B1 | 4/2001 | Li | 370/230 |
| 6,249,530 | B1 | 6/2001 | Blanco et al. | 370/468 |
| 6,298,041 | B1 | 10/2001 | Packer | 370/231 |
| 6,320,846 | B1 | 11/2001 | Jamp et al. | 370/235 |
| 6,330,700 | B1 | 12/2001 | Morris et al. | 714/752 |
| 2001/0024452 | A1 | 9/2001 | Liu et al. | 370/468 |
| 2002/0103915 | A1 | 8/2002 | Shuster | |
| 2002/0159480 | A1* | 10/2002 | Sekihata et al. | 370/468 |

FOREIGN PATENT DOCUMENTS

EP 1 126 666 A2 8/2001

OTHER PUBLICATIONS

Features Overview, Maximizing The Power Of E-Business, Version 0.8 (3 pages; undated).
Bandwidth Management, Optimizing The User Experience, Version 0.8 (4 pages; undated).
Li and Ammar, "Bandwidth Control for Replicated-Stream Multicast Video Distribution," College of Computing, Georgia Institute of Technology, Atlanta, GA (8 sheets; undated).
NEC CX Series: "White Paper on IP QoS Control" (5 sheets; printed Jan. 15, 2002).

(Continued)

*Primary Examiner*—Kevin C. Harper
(74) *Attorney, Agent, or Firm*—Perkins Coie LLP (57) ABSTRACT

A method and system for controlling the bandwidth of a transmission of data content to a target bandwidth by varying the size of the data packets and providing a fixed wait, or pause, time between successive packets. The factors of predetermined target bandwidth and wait time are used to compute and transmit the data in a plurality of transmission cycles having a predetermined number of packets of both a minimum and maximum size with the fixed wait time between successive packets. The method and system also can be used with network protocols that have a fixed maximum protocol packet size that is less than the value of the minimum value packet size.

20 Claims, 6 Drawing Sheets

OTHER PUBLICATIONS

Solutions: "The NetEnforcer in a Satellite Environment" (5 sheets; printed Jan. 15, 2002).

News Release: "Session QoS Techniques for Video Delivery on the Internet" (4 sheets; printed Jan. 15, 2002).

Paul Farrell, "2.2 Gigabit Ethernet Technology" (3 sheets; printed Jan. 15, 2002).

International Search Report, Apr. 14, 2004.

* cited by examiner

METHOD AND SYSTEM FOR VARYING DATA PACKET SIZE FOR CONTROLLING BANDWIDTH

FIELD OF THE INVENTION

The invention relates to a method and system for controlling the size of data packets transmitted from a sender device to one or more receiving devices, for achieving bandwidth control.

BACKGROUND OF THE INVENTION

In performing data transmission using various media such as cable, telephone line, satellite communication, etc., it is conventional for the data to be sent from one device to one or more receiving devices. The data is first fragmented, or segmented, into packets and then the packets transmitted, or broadcast. The term "packet" is used herein and conventionally to indicate a sequence of bytes of digital data and represents the smallest unit of transmission and reception. Hereafter, a "device" is defined as a hardware element, usually having a software component, capable of receiving and/or transmitting data packets. Examples of such devices include computers, GPRS mobile phones and network equipment.

The term "content", as used herein, indicates data that is segmented into a sequence of packets. The data contained within the content could be a file, or part of a file, part of a data stream, or any collection of data. The content can comprise pure data, or audio and video data streams, or of any combination. The content is sent in sequentially transmitted packets from a sender device to one or more receiving devices.

The sending and receiving devices typically run software programs in conjunction with a computer, whose purpose at the sender device is to fragment the content to be sent into the packets, and at the receiver device to reassemble the packets received into the original content.

Bandwidth is conventionally defined and used herein to mean the amount of data that can be transmitted over the media in a given time frame, for example, 10 Mbps (10 million bits per second). Essentially, this is the speed of the transmission, that is, the speed at which data of the content is sent from the sending device to the receiving devices. Each transmitting-receiving system has a certain bandwidth capability that is defined by various factors, such as the type of media used for the transmission and the hardware and software equipment used for transmission and reception of the data at the sending and receiving devices. For example, a broadband cable medium has a larger bandwidth capability than a telephone line.

Various types of protocols are used to transmit the data packets forming the content. Some protocols may be considered to be "unreliable", herein meaning any transmission protocol that provides best-effort delivery of packets, and in particular, does not perform automatic re-transmission of lost or corrupted packets. Examples of "unreliable" protocols currently in common use include unicast and multicast User Datagram Protocol (UDP), ATM Adaption Layer (AAL) Types 3/4 and 5 in non-assured transmission mode, AppleTalk DDP datagrams, and unicast and broadcast MPEG-2 transport streams.

Often, data from different files, that is, different content, is to be transmitted at the same time over the same media. For example, if a particular system has a 10 Mbps bandwidth transmission capability, the packets of two different contents can be transmitted at the same time in separate streams, for example, each stream of 5 Mbps bandwidth. In various commercial applications, portions of the available bandwidth of a given media are sold, or leased to several different customers for use at the same time.

Some applications require that packets are to be received in a regular and timely fashion, for example, for audio and video transmissions in which it is important that the jitter (i.e., the amount of variation in the end-to-end packet transit time) is kept as low as possible. Increasing reliability at the receiving device implies use of a high precision control of the bandwidth at the sending device, especially for broadband applications.

In general, the bandwidth usage of a broadcast application is selected according to network load and speed, leased bandwidth capacity, and processing speed of the receiving device. The bandwidth allocated for a given transmission is hereafter referred to as the "target bandwidth" ($B_T$). During the transmission, the actual bandwidth used can vary relative to the selected target bandwidth.

As the broadcast takes place, the bandwidth varies and can be measured at any time. The "instantaneous bandwidth" is the bandwidth measured in the shortest measurable time. For example, if the bandwidth usage is regularly checked once per second, the instantaneous bandwidth is computed by dividing the quantity of data transferred in that time frame (in this case 1 second) by that time interval.

The broadcast of the content has an "average (or mean) bandwidth" $B_M$. This is the total amount of data transmitted during a transmission divided by the transmission duration. The terms "mean bandwidth" and "average bandwidth" are used interchangeably herein.

Since the content is transmitted in packets, there is a pause, or wait time ($t_w$), between the start of transmission of successive packets. The wait time between packets is related to the bandwidth used during transmission of a content. For example, increasing the wait time between packets while maintaining a fixed packet size results in less data transmitted during a given time, and vice versa.

If data is sent without a precise control relative to the target bandwidth, various problems can arise. Basically, there are three different scenarios that can cause a problem:

(1) the average bandwidth $B_M$ is too high relative to the target bandwidth $B_T$ value;

(2) the average bandwidth $B_M$ is too low relative to the target bandwidth $B_T$ value;

(3) the average bandwidth $B_M$ is equal, or very close, to the target bandwidth $B_T$, but the instantaneous bandwidth values measured during the transmission are different from the target bandwidth. This type of transmission is hereafter referred to as heterogeneous, i.e., contains peaks.

The problems caused by the different scenarios described above can adversely affect different components and structures of the system that receive the data, such as routing and switching devices and the destination receiver devices. This is described below.

(1) Sending data packets too fast. Broadcasting of the data at a speed above the target bandwidth $B_T$ usually results in substantial packet losses. Loss of packets reduces the integrity of the data transmission. Also, too high a transmission speed can cause congestion if routing devices are not able to buffer the incoming data stream. The same problem can affect encapsulators if data is sent to a satellite uplink. Here, entire series of packets can be lost. At the receiving device side, packet reassembly can be difficult if the hardware or software application program processing the received data is not designed for an incoming data stream speed higher than the bandwidth mean (average) value. Moreover, a local area network (LAN) to which the receiving devices are connected can experience congestion if no traffic buffering mechanism is provided between the data transmitter and the receiving devices.

(2) Sending data packets too slow. If the packets are transmitted at a speed lower than the specified target bandwidth, no losses of data packets should be experienced. However, a resource waste is caused, especially if the connection between the data transmitter and receiving devices is purchased or leased on a bandwidth usage basis instead of on a transmitted data amount basis. Also, audio and video streaming quality can be affected if the receiving data rate is too low. That is, the received sound and video will be intermittent, garbled, or otherwise distorted (3) Peaks in bandwidth usage. Even when the average output transmission bandwidth is close to the target bandwidth does not always guarantee that the data stream will be free of problems. For example, there can be bandwidth usage peaks at any instant during transmission. Also, if the packets are not homogeneously distributed during the transmission, i.e., a fairly constant time between the successive packets, packet clustering occurs that causes an increase or decrease of the bandwidth used at a given instant, this being the instantaneous bandwidth. As a result, the same problems described above for transmissions with mean bandwidth higher or lower than the target bandwidth can arise, although the adverse affects are experienced to a lesser degree.

Another parameter that can be considered is the transmission burstiness, which is defined as:

$$Burstiness = \frac{B_{peak}}{B_M}$$

where $B_M$ is the mean bandwidth of a transmission content, and $B_{peak}$ is the highest of the absolute instantaneous bandwidth values measured during a transmission. That is:

$B_{peak} = \max(B_{[t,t+\Delta t]})$ $B_{[t,t+\Delta t]}$: instantaneous bandwidth B measured in the interval included between t and t+Δt. Ideally, the burstiness should tend to one. That is, the bandwidth being used should be centered at $B_T$. Ideally, $B_M = B_T$. Note also that under the same conditions of burstiness, the transmission homogeneity could be different, since no information is provided in this value about the recurrence of $B_{peak}$. In fact, the burstiness value says how large the peak is relative to the mean transmission bandwidth $B_M$, but not how many times the peak is repeated during a transmission. That is, a transmission can experience 1 or 1000 peaks, but the value $B_{peak}$ is the same in most or all cases. Also, no information is provided about the homogeneity of the transmission.

Accordingly, it would be desirable to be able to better control the bandwidth usage for the transmission of packets containing any type and different amounts of content. Prior attempts to solve the various problems discussed above typically enforce a maximum bandwidth. That is, the transmission protocol is such so as to intervene when a maximum value bandwidth is exceeded, but does not intervene when the bandwidth usage is lower than the maximum. Other existing solutions correct existing traffic streams. That is, a protocol is used to solve congestion problems caused by senders without inbuilt traffic control. Still other existing solutions discard packets when buffer space is exceeded. Some of the solutions of this type discard packets using an algorithm, such as the "leaky bucket" algorithm (Tanenbaum, Computer Networks, 3rd Edition, p. 380, Prentice Hall). Other solutions permit a certain amount of burstiness in the output stream using an algorithm such as the "token bucket" algorithm (Tanenbaum, p. 381).

Prior application Ser. No. 10/062,830, filed Jan. 31, 2002, which is assigned to the same Assignee, the entirety of which is herein incorporated by reference, provides a method and apparatus by which the bandwidth can be held more closely to a desired target bandwidth $B_T$ value by properly selecting the pause (wait time $t_w$) between the successive packets and the packets are transmitted using the selected wait time during the transmission of the content. The method and system of that application determines the wait time $t_w$ between packets in accordance with a novel algorithm developed and implemented that relates the desired size P of the packets of a content to be transmitted to the desired target bandwidth $B_T$. The parameters of desired target bandwidth $B_T$ and size of the packets P are provided or selected, and from these the wait time $t_w$ is computed. By properly selecting and controlling the wait, or pause, time pause $t_w$, between the transmission of the successive packets the transmission of the content at the desired target bandwidth is more closely controlled and maintained at the selected value.

The invention of that application can be implemented in software and/or hardware. In a preferred embodiment of that invention, the precision of the bandwidth control is maximized by the use of the highest resolution clock or other timing device available at the sending device. This provides the best compensation for wait time $t_w$ rounding errors, i.e., rounding the wait time value up or down to the nearest whole number value achievable by the system timing devices.

BRIEF DESCRIPTIONS OF THE INVENTION

The present invention is directed to another method and system for controlling bandwidth to a target value $B_T$ during transmission of the packets of a content. In the present invention, the size of the packets transmitted during a "cycle" is varied. As used herein, the term "cycle" means a given number of packets having different sizes. A number of cycles of packets is used during the transmission of a content.

In implementing the system and method of the invention the content to be sent is divided into packets. The packets are regularly sent with a fixed wait time interval $t_w$ between successive packets. The packets are of two different sizes, a minimum $P_{min}$ and a maximum $P_{max}$, during the transmission and possibly one of a third size between $P_{min}$ and $P_{max}$ for the last packet of the content. This results in the average bandwidth usage value $B_M$ being as near as possible to the target bandwidth $B_T$ for the given transmission. Also, the instantaneous bandwidth $B_I$ should be as near as possible to the target bandwidth $B_T$ (in order to keep the burstiness as low as possible).

In considering the present invention as compared to the prior application, in the prior application the size of all packets was fixed to a value P (with the possible exception of the last packet). In this invention, the packets can have two different sizes: $P_{min}$ or $P_{max}$ (again, with an exception for the last packet).

The method and system of the present invention finds particular use in applications using "unreliable" protocols, such as UDP, which do not use a comeback or returning traffic, as distinguished from so-called "reliable" protocols, such as TCP, which utilize such return traffic.

BRIEF DESCRIPTION OF THE DRAWINGS

Other objects and advantages of the present invention will become more apparent upon reference to the following specification and annexed drawings, in which.

DETAILED DESCRIPTION OF THE INVENTION

In the method and system of the invention, the sending device is computer controlled and transmission of the content at the sending device is controlled by a computer application program. The program is structured to make the necessary calculations and control the size of the packets and distribution of packets of different sizes and the transmission of such packets. This is described below. The computer program is written using any suitable conventional programming language.

In using the preferred embodiment of method and system, the input parameters for the application program are:

- target bandwidth $B_T$
- fixed waiting interval between packets $t_w$
- minimal data block size used in forming a packet that can be handled $d_{min}$ The target bandwidth $B_T$ represents the bandwidth at which the content (including the protocol overhead) is to be sent. This parameter is typically specified on a per-transmission basis. As explained above, several transmissions with the same or different target bandwidth $B_T$ can be taking place at the same time over the same medium. A properly constructed system can use one computer and one application program to accomplish this, or there can be a separate computer and application program for each transmission.

The wait time interval $t_w$ is the time interval that occurs between successive packets of the transmission. The use of a high-resolution timer is not required in the preferred embodiment of the invention, but it is important that the hardware and/or software implementation of the sending device is capable of reliably waiting for the desired interval with a relatively high degree of precision. In general, the wait time interval is chosen according to the hardware and software (operating system, programming language) specifications. Usually, the limitations are on the software side. When programming, there typically exist functions that can be implemented to wait for a desired time. Specifications exist that describe the precision limitations of these functions, also according to the operating system used. It should also be considered that the intercorrelations between functions implemented in software development kits and operating systems are not always well predictable. The following is a procedure used in the preferred embodiment of the invention in choosing the wait time interval:

- choose a function according to the software application kit and/or programming language used for development. For example, there can be a given function called "wait" where the input parameter is the waiting time in a given time unit, e.g., wait (10) means wait 10 milliseconds.
- carefully select the function limitation in relation to the operating system to be used. For example, if the time limitation for the wait( ) function on a given operating system is 1 millisecond, the input parameter for the function cannot be smaller than 1 millisecond.
- consider that usually the limit provided in the specifications is not real. For example, if the program calls for wait(1), it can happen that, in reality, the wait time will be more than 1 millisecond. For this reason, it is preferred that the effective precision of the time function be proven. This can be efficiently done by repeating many times (e.g., 1 million) the function with its limit and computing an average inaccuracy. For example, the function waits 1.3 milliseconds instead of the specified 1.0 millisecond value.
- once this real limit is found, it must be considered that if concurring software applications or processes run on the same machine, that delays can result. It is very important to be sure that a precise wait time can be ensured during the entire transmission. For this reason, a "security factor" must be chosen in the development of the sending application. It also must be considered that by increasing the wait time, the wait time precision increases, but also the transmission burstiness, defined above, will increase (if the other parameters are fixed). Here, the decision must be made considering both factors and also other factors, e.g., the transmission protocol used, the maximum transmission bandwidth to be reached, etc. In a typical application, the security factor of 10 can be chosen. That is, the wait time interval will be 10 milliseconds (instead of 1 millisecond) as described in the programming specifications. This is valid for the example mentioned above, but it is not a general rule. The choice of the values 1 millisecond/10 milliseconds are strictly related to the example.

Since in the present invention the wait time interval between successive packets is fixed, this method and system are suitable for use where a high-resolution timer is not available.

In the invention, the minimal data block size $d_{min}$ represents the smallest contiguous collection of data that the application program can transmit. As explained below, this value must be at least equal to the protocol overhead of a packet plus 1 byte. By increasing the minimal data block size $d_{min}$, the percentage of "useful" data (content data) contained in a given cycle packet is increased, i.e., the proportion "content data vs. header information" increases. Nevertheless, increasing the minimal data block size will increase the difference between $P_{max}$ and $P_{min}$ and, consequently, the transmission burstiness (if the other parameters are fixed).

In the system and method, the content of a transmission to be sent is divided into packets. The packets are regularly sent with a fixed interval $t_w$ between successive packets. The packets are of two different sizes, a minimum $P_{min}$ and a maximum $P_{max}$, during the transmission and possibly one of a third size between $P_{min}$ and $P_{max}$ for the last packet of the content. This results in the average bandwidth usage value $B_M$ being as near as possible to the target bandwidth $B_T$ for the given transmission.

Moreover, the wait time $t_w$ should be chosen according to the minimum data block size $d_{min}$. If the difference between $P_{min}$ and $P_{max}$ is large, the wait time should be kept as small as possible (but according to the precision limit described above). Again, the difference between $P_{min}$ and $P_{max}$ is equal to $d_{min}$.

Figure 1A:
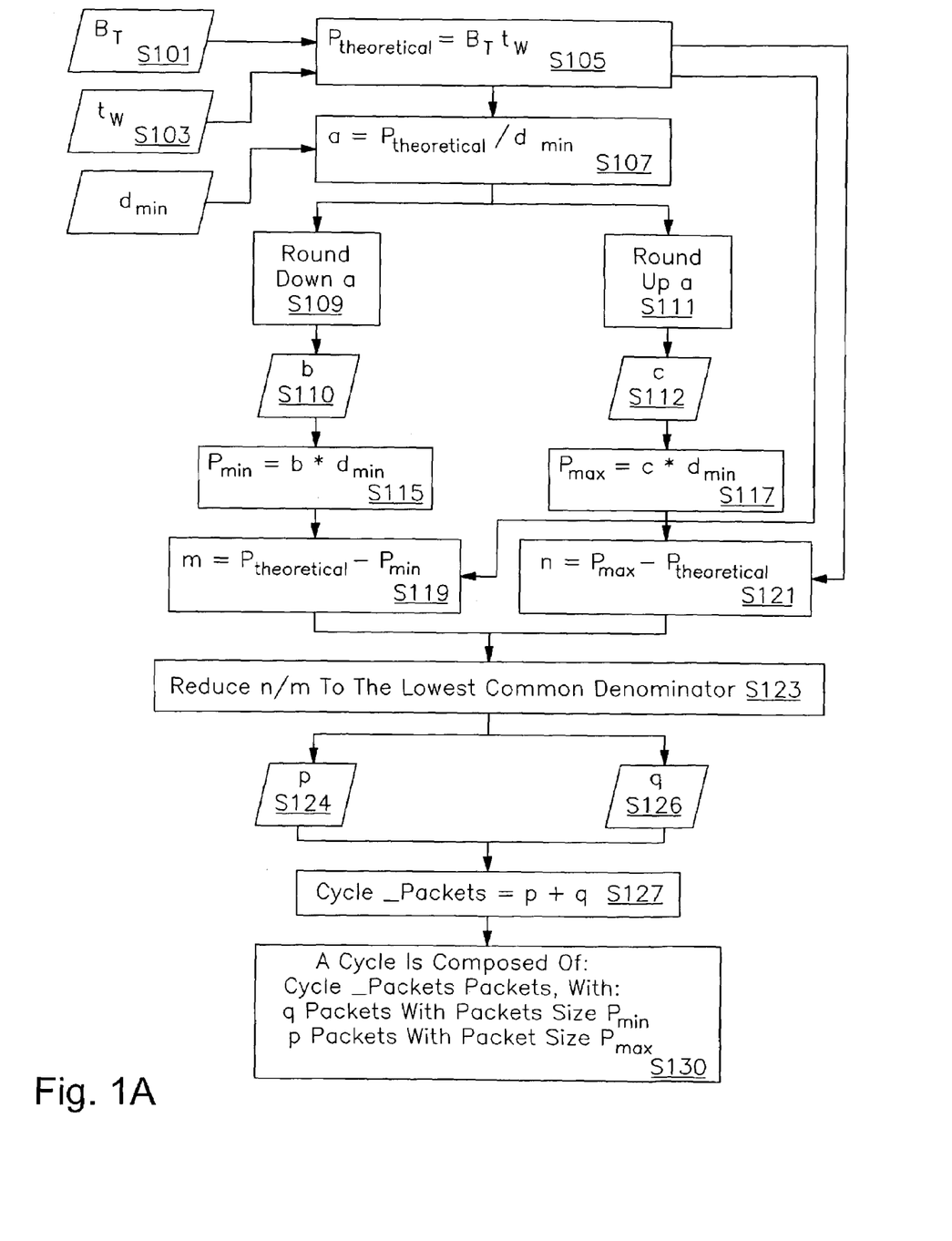
FIGS. 1A-1D are flow charts showing the computation of the packet sizes.
Figure 1B:
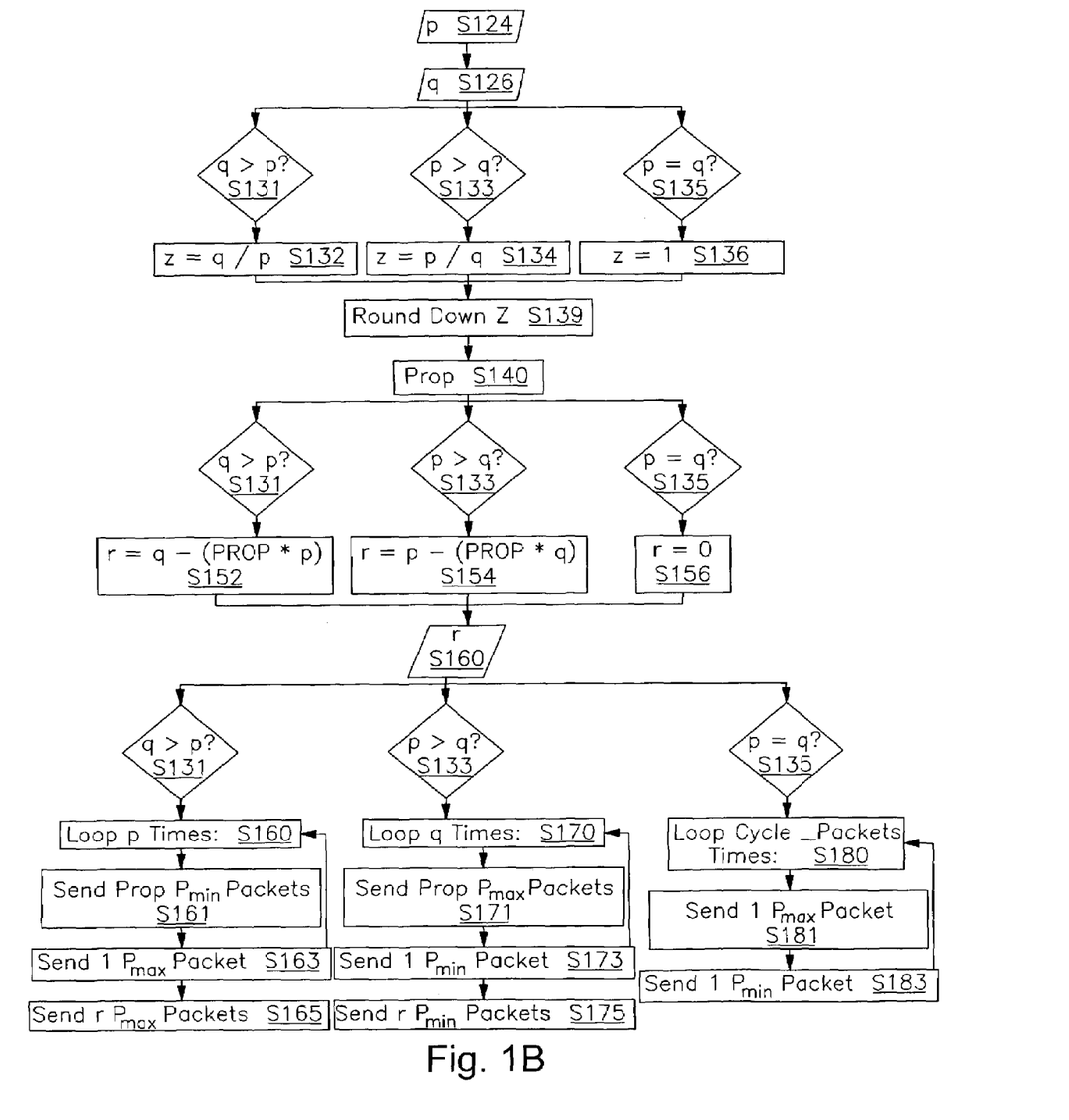
Figure 1C:
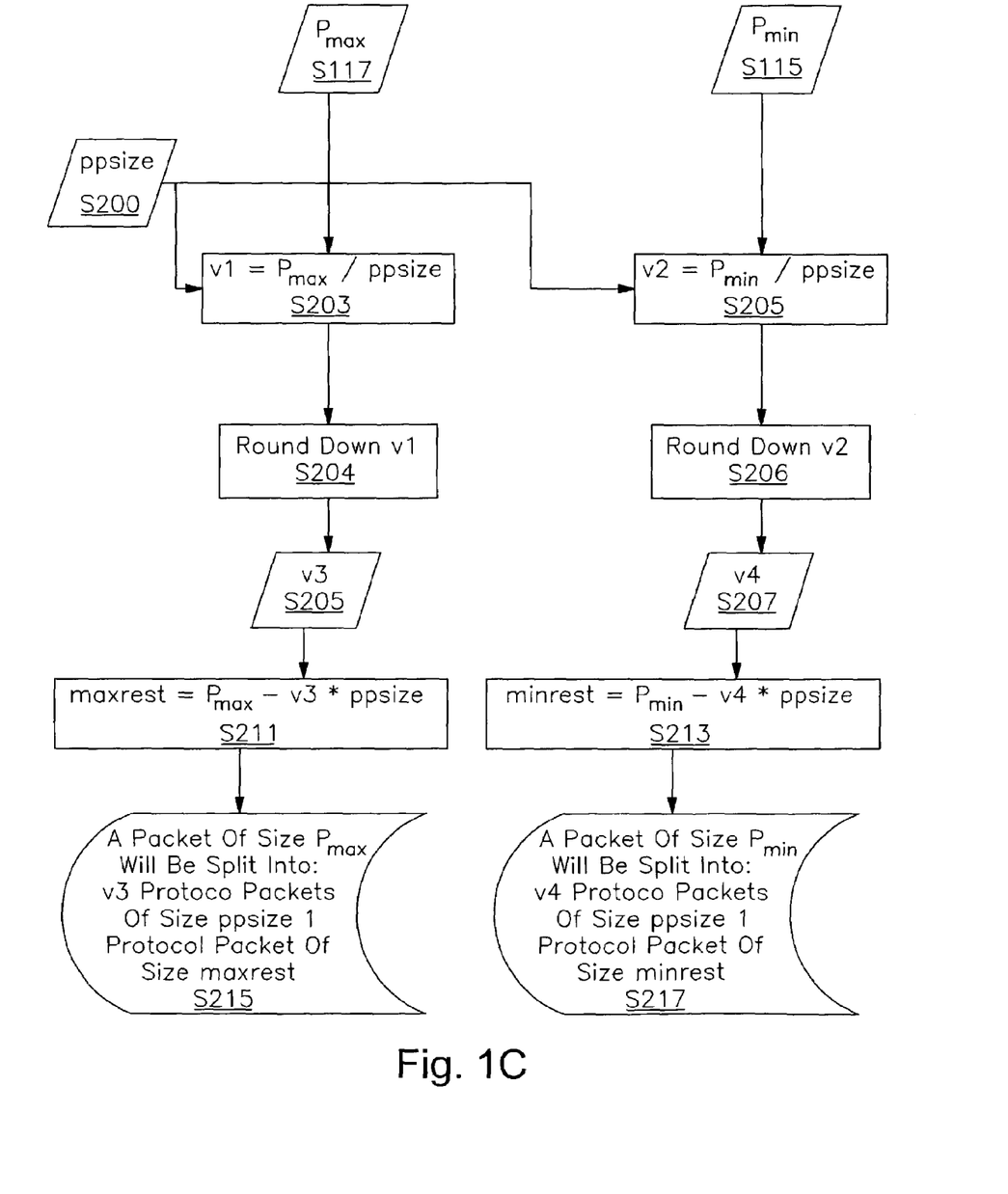

The maximum and minimum of the instantaneous bandwidth, defined above, used during the wait time $t_w$ between successive packets can be calculated using the following formulae:

$$B_{max} = \frac{P_{max}}{t_w}$$

$$B_{min} = \frac{P_{min}}{t_w}$$

where
$B_{max}$=maximum instantaneous bandwidth
$B_{min}$=minimum instantaneous bandwidth
$P_{max}$=maximum size packet
$P_{min}$=minimum size packet FIGS. 1A-1C show the implementation of the invention. In particular, the drawings 1A-1D show the following processes:

FIG. 1A (steps S101-S130) depicts the computation of packet composition by computing the different packet sizes and the number of packets for each packet size during a cycle. During a cycle, the average bandwidth $B_M$ must be equal to the target bandwidth $B_T$ (exception can be the last cycle).

Referring to FIG. 1A, in S101 and S103 the target bandwidth $B_T$ and wait time $t_w$, are input to the computer application program. The process steps are sequentially numbered.

1. Using the values input from S101 and S103, in S105 a theoretical packet size $P_{theoretical}$ is calculated where $$P_{theoretical} = B_T * t_w \quad \text{(Eq. 1)}$$

The theoretical packet size $P_{theoretical}$ is the theoretical size that every packet should have in order to ensure that the target bandwidth $B_T$ for a given content transmission is achieved when sending packets with a fixed wait time interval $t_w$ between successive packets. The packet size granularity (rounding packet size to a whole number) is not infinitesimally small, but is determined by the minimum data block size $d_{min}$ that makes up the packet. For example, if the minimum data block size that the application program can handle is 50 Bytes, and the $P_{theoretical}$ packet size value (resulting from (Eq. 1) is 976.45 Bytes, the possible packet sizes rounded down to the theoretical value is 950 Bytes and 1000 Bytes. Here, 950 Bytes=$P_{min}$ and 1000 Bytes=$P_{max}$.

It is also possible to consider $P_{theoretical}$ as the average packet size during the transmission in order to achieve the target bandwidth $B_T$ by sending the packets of the theoretical size with a fixed $t_w$ interval therebetween.

As explained above, a relationship exists between the various input parameters. In a typical example, the maximum target bandwidth $B_T$ for the application is selected. For example, the software program will reasonably send the data at a maximum of 50 Mbps. Then the theoretical packet size $P_{theoretical}$ is computed using the previously selected $t_w$. Considering now the transmission protocol packet size and header information, a reasonable value for $d_{min}$ is computed for carrying the content data, but also trying not to increase the burstiness too much.

For example: if the target bandwidth $B_T$ is 50 Mbps and the wait time $t_w$ is chosen as 100 milliseconds (0.1 seconds), then the theoretical packet size is 5 Megabits (=5000000 bits), that is, 625000 Bytes. Consider a transmission protocol with a maximum packet size of 350000 bytes and overhead of 35 bytes is used (theoretical transmission protocol, for example). Also, consider that it is desired to send protocol packets as large as possible. That is, the cycle packet size when rounded will vary between 350000 and 700000 bytes. This can cause a relatively high burstiness, depending on the chosen wait time $t_w$. Alternatively, the choice can be made to send protocol packets of 35000 bytes (10 times less), with cycle packet sizes of 595000 and 630000 bytes, respectively. Since the overhead size per protocol packet is very small (35 bytes), the content data is efficiently sent and the burstiness is dramatically decreased (considering the same wait time $t_w$).

2. Because of the impossibility of creating packets with a size granularity smaller than $d_{min}$, in S107 the minimal and maximal packet sizes are determined, and computed as follows:

$$a = \frac{P_{theoretical}}{d_{min}} \quad \text{(Eq. 2)}$$

3. In S109, the computed value a is rounded to an integer by defect (round down), to obtain an integer value b used for S110.

4. In S111, the computed value a is rounded to an integer by excess (round up) to obtain an integer value c used for S112

Note that b≦a and c≦a, therefore: b≦a≦c.

5. In S115 a minimum packet size value $P_{min}$ is computed as:

$$P_{min} = b \cdot d_{min} \quad \text{(Eq. 3)}$$

6. In S117 a maximum packet size value $P_{max}$ is computed as:

$$P_{max} = c \cdot d_{min} \quad \text{(Eq. 4)}$$

Note that $P_{min} \leq P_{theoretical} \leq P_{max}$.

After having found the minimum $P_{min}$ and maximum $P_{max}$ packet sizes, it is necessary to find the right proportion of such packets to be used during transmission of the content in order to achieve on average a transmission of the content at the target bandwidth $B_T$. That is, on average (of the $P_{min}$ and $P_{max}$ packets) the packet size must be as near as possible to $P_{theoretical}$.

The purpose of this also can be described as trying to distribute the packets in order to maximize homogeneity, i.e., decrease burstiness as much as possible.

To find the proportional number of packets having sizes $P_{min}$ and $P_{max}$, the following steps are followed:

7. In S119 a value m is computed as:

$$m = P_{theoretical} - P_{min} \quad \text{(Eq. 5)}$$

8. In S121, a value n is computed as:

$$n = P_{max} - P_{theoretical} \quad \text{(Eq. 6)}$$

where each of m and n is a whole number

9. The values m and n determine the population of the different size packets. That is:
   if m<n there will be a majority of packets with packet size $P_{min}$;
   if n<m there will be a majority of packets with packet size $P_{max}$; and
   If m=n there will be the same number of packets with packet size $P_{min}$ as packets with packet size $P_{max}$.

Note that if m and n are equal to zero, the size of all packets will be equal to $P_{theoretical}$.

10. In S123 the value $$\frac{n}{m}$$

is reduced to the lowest common denominator, in order to obtain values p in S124 and q in S126 to restate the value in the form $$\frac{q}{p}.$$

That is (mathematically), there exists an integer x≧1 for which:

$$\frac{n}{m} = \frac{q \cdot x}{p \cdot x}$$

11. In S127, a value cycle_packets (the number of packets contained in a cycle) is computed as:

cycle_packets=p+q  (Eq. 7)

That is, a cycle is composed in Step S130 of:
  cycle_packets packets, with:
    q packets with packet size $P_{min}$, and
    p packets with packet size $P_{max}$.

Note that, if p and q are equal to zero (that is, the packet size is $P_{theoretical}$ for all packets) no cycle will be performed, but the content will be divided into packets of constant size and sent with a time interval $t_w$ between successive packets.

The transmission of content involves transmission of many cycles composed of a number of cycle_packet packets until the last packet of the content is sent. Note that the size of the last packet can be smaller than $P_{max}$ and also smaller than $P_{min}$, depending on how many bytes must be sent in order to complete the content transmission.

It is preferred to achieve transmission homogeneity. That is, the packets transmitted in a cycle are to be distributed in a smoother sequence than simply sending q packets with packet size $P_{min}$ and p packets with packet size $P_{max}$. To do this, reference is made to FIG. 1B.

FIG. 1B (steps S131-S183) depicts computation of the distribution of packets during a cycle. The purpose of this proportional distribution is that the instantaneous bandwidth must be as near as possible to the target bandwidth, i.e., to decrease as much as possible the burstiness.

Referring to FIG. 1B, the following steps are performed:

12. Using the values p from S124 and q from S126, a value z is computed in one of S131, S133, S135 by testing q against p to produce z where:

$$\text{In } S132 \; z = \frac{q}{p}, \text{if } q > p \quad (Eq. 8)$$

$$\text{In } S134 \; z = \frac{p}{q}, \text{if } p > q$$

In S136 z=1, if p=q (also in the case p=q=0)

13. In S139 the quantity z is rounded by defect (down) to the nearest integer value to produce the value prop in S140.

14. Using the results of the tests of p against q of S131, S133 and S135 in S160 a value r is computed which in a cycle composed of cycle_packets packets, where r is the number of "isolated" packets as follows:

r=q−(prop*p), if q>p r=p−(prop*q), if p>q r=0, if p=q  (Eq. 9)

15. In a cycle, the packets will be sent in the following sequence, using the results of the p against q test of S131, S133 and S135, as set forth in a), b) and c) below:

a) If q>p:
then loop p times as controlled by S160, send prop $P_{min}$ packets in S161, send 1 $P_{max}$ packet in S163, and send r $P_{max}$ packets in S165 b) If p>q:
then loop q times as controlled by S170, send prop $P_{max}$ packets in S171, send 1 $P_{min}$ packet in S173, and send r $P_{min}$ packets S175 c) If p=q:
then loop the number of cycle_packets times as controlled by S180,
send 1 $P_{max}$ packet in S181, and send 1 $P_{min}$ packet S183.

In this way the process is complete: the transmission is composed of many cycles of cycle_packets number of packets.

In a cycle, the packet transmissions are distributed as described in point 16 of Example 1 below.

It is typical for an application program sending data on a network to use network protocols in order to address the packets to the receiver devices. Network protocols typically have a fixed maximum protocol packet size. For example, for the ATM protocol this size (size of a cell) is 53 Bytes. This means that the herebefore called packets are blocks of data which must be fragmented into protocol packets depending on the maximal protocol packet size. For example, if a packet of size 200 Bytes must be sent on an ATM protocol network, it will be split into 3 protocol packets of 53 Bytes (max protocol packet size for ATM) and one protocol packet of 41 Bytes. This does not impact the process described above relative to the determination of the number of packets of each of $P_{max}$ and $P_{min}$ to be transmitted during a cycle, since this fragmentation of a transmitted packet into its constituent smaller size protocol packet does not impact the transmission of the protocol packets in a way that these can be considered as a single larger packet.

On average during a content transmission, the packets size would be $P_{theoretical}$ and therefore the bandwidth used equal to $B_T$.

An increase of the minimal data block size $d_{min}$ handled by the application program and/or of the time interval between the successive packets can cause an increase of the instantaneous bandwidth (depending on the transmission sample rate). Also, an increase of the minimal data block size handled can cause an increase of the difference of the value $P_{max}-P_{min}$, leading to an increase of the burstiness.

Figure 1D:
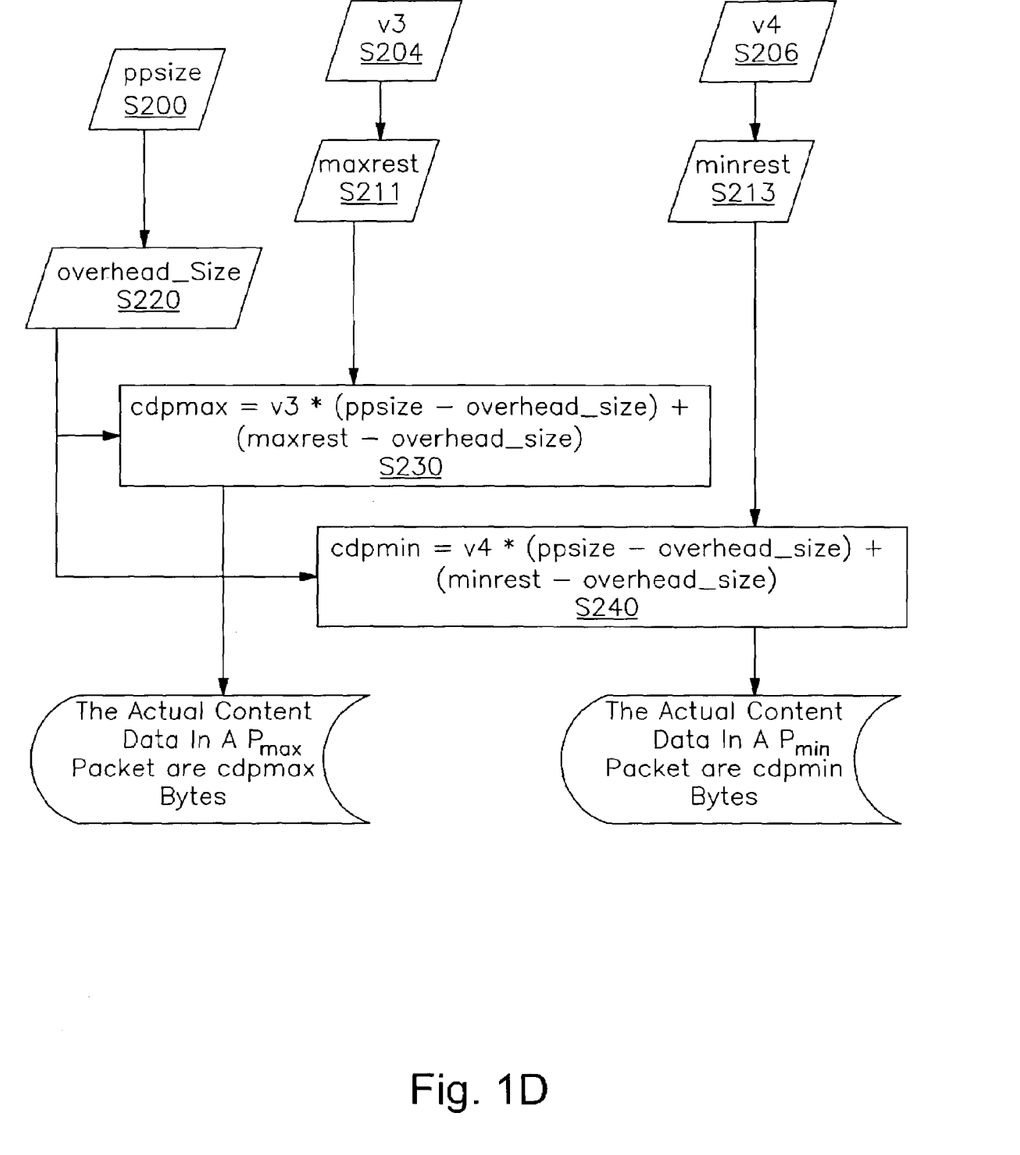

A refinement of the invention used in accommodating data protocol packet size is described referring to FIGS. 1C and 1D.

FIG. 1C depicts the composition of packets according to transmission protocol packets. That is, the method and system of the invention can be applied to any transmission protocol. Here, the purpose of the process is to compute how many protocol packets (e.g., UDP packets) must be put together to create a cycle packet. As defined herein, each protocol packet is of a size ppsize. This computation is done for both $P_{max}$ and $P_{min}$. This is important because, when implementing a software application, the transmission control is implemented at transmission protocol level, i.e., the programmer can control how many packets of a given protocol are sent. In this way, the programmer can say, for example, a cycle packet of size $P_{max}$ is composed by a number of UDP packets. The number of the protocol packets is computed as described below. It should be noted that for every properly working software application, $d_{min}$ must be equal or smaller than ppsize. Otherwise, the application is not able to handle data blocks of size ppsize. That is, the application is not able to transmit using the chosen transmission protocol (with protocol packet size ppsize).

In S200, the protocol packet size ppsize [Bytes] is used as an input parameter. The protocol packet size ppsize represents the maximum protocol packet size for those protocols, which can have a varying protocol packet size (e.g., UDP). Other transmission protocols have fixed protocol packet size (e.g., ATM). Knowing the values of $P_{min}$ and $P_{max}$ from S115 and S117, the packet composition at network protocol level can be computed as follows:

1. Compute in S203 and S205 the values v1 and v2 as:

$$v1 = \frac{P_{max}}{ppsize} \qquad \text{(Eq. 10)}$$

$$v2 = \frac{P_{min}}{ppsize} \qquad \text{(Eq. 11)}$$

2. In S204, round v1 by defect [down] to the nearest integer value, obtaining v3 in S205.
3. In S206, round v2 by defect to the nearest integer value, obtaining v4 in S207.
4. Compute in S211 maxrest as:

$$maxrest = (P_{max} - v3 * ppsize) \qquad \text{(Eq. 12)}$$

5. Compute in S213 minrest as:

$$minrest = (P_{min} - v4 * ppsize) \qquad \text{(Eq. 13)}$$

6. As shown in S215, a packet of size $P_{max}$ will be split into:
   v3 protocol packets of size ppsize, and
   1 protocol packet of size maxrest.
7. As shown in S217, a packet of size $P_{min}$ will be split into:
   v4 protocol packets of size ppsize, and
   1 protocol packet of size minrest.

Typically, the address of the receiver devices to which the content is to be transmitted is contained in the same packet in which the content data is stored. The part of the packet which contains the address of the receiving devices and other information (not belonging to the content to be sent) is hereafter called overhead.

A protocol packet sent on the network will therefore contain a given overhead of a value "overhead size", input in S220, and a given amount of content data. The amount of content data sent in a packet of size $P_{max}$ and $P_{min}$, respectively, depends on the number of protocol packets resulting from the splitting process needed by the network protocol, described above, and also on the overhead of every protocol packet.

As is described referring to FIG. 1D, this process computes the data content of a given packet. In fact, common transmission protocols use a header, containing protocol data (e.g., the receiver address). In this header, no "useful" data of the content to be sent is contained. The issue is still that when implementing a software application, the programmer must be able to say how much content should be put in a packet. This allows knowing how much space of a packet is reserved for "useful" data and how much space is spent for header information.

Referring to FIG. 1D, in S220, given as an input parameter the size of the overhead overhead_size [Bytes], the content data contained in the protocol packets are:

8. for computing the information in the packet of size $P_{max}$:
   v3 protocol packets containing (ppsize−overhead_size) bytes of content data, from S204, and
   1 protocol packet containing (maxrest−overhead_size) bytes of content data.

That is, in a packet of size $P_{max}$, the actual bytes of content data cdpmax are given in S230 by:

$$cdpmax = \frac{v3 * (ppsize - \text{overhead\_size}) +}{(maxrest - \text{overhead\_size})} \qquad \text{(Eq. 14)}$$

9. for computing the information in the packet of size $P_{min}$:
   V4, from S206, protocol packets containing (ppsize−overhead size) bytes of content data, and
   In S240, it is determined that 1 protocol packet containing (minrest−overhead_size) bytes of content data.

That is, in a packet of size $P_{min}$, the actual bytes of content data cdpmin are given in S240 by:

$$cdpmin = \qquad \text{(Eq. 15)}$$
$$v4 * (ppsize - \text{overhead\_size}) + (minrest - \text{overhead\_size})$$

EXAMPLE 1

Figure 2:
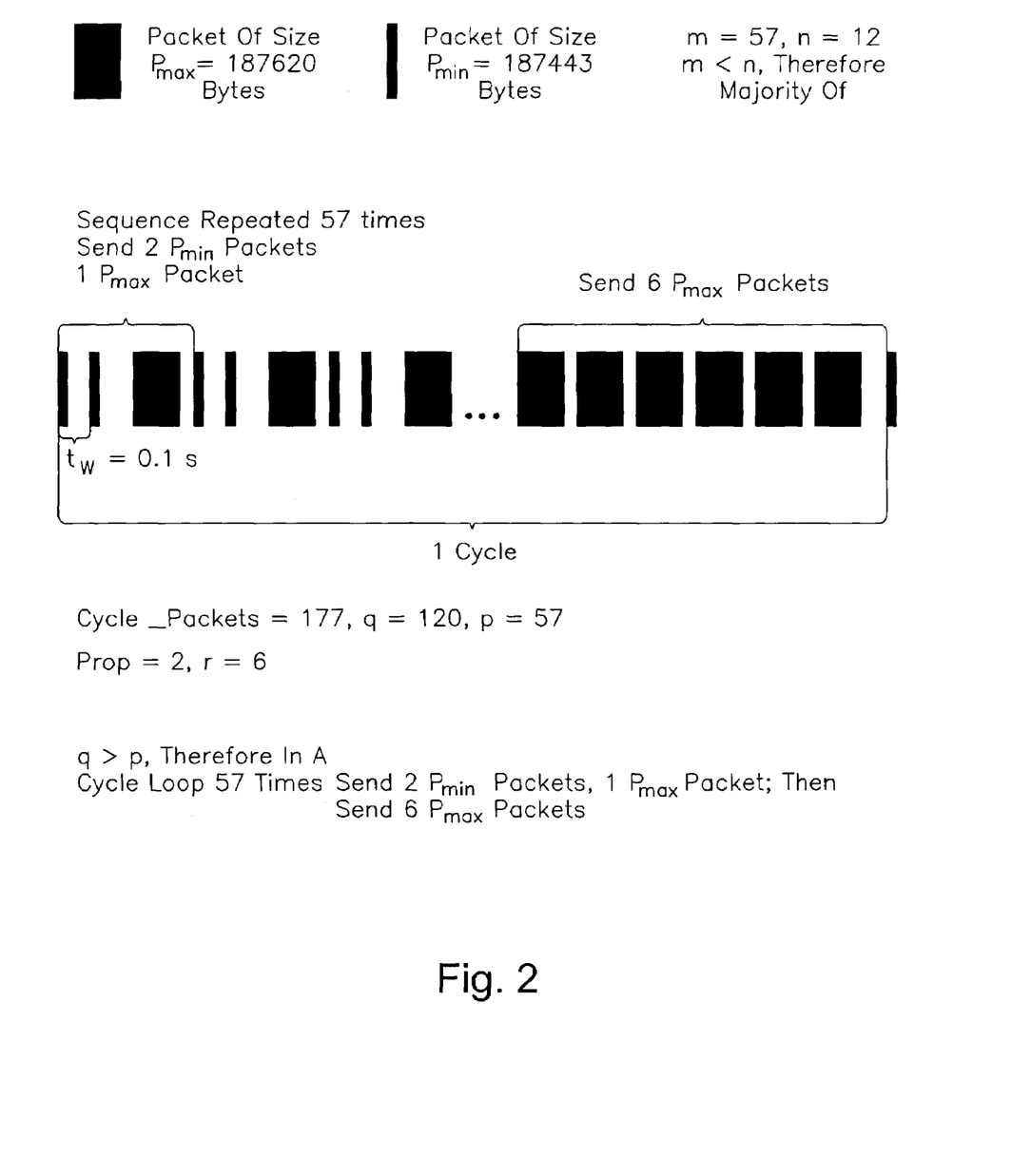
FIG. 2 is a diagram illustrating transmission during one cycle.

Reference is made to the equations above and also to FIGS. 1A-1D. Reference is also made to FIG. 2 which illustrates the proportional distribution of the different packets during a cycle, in order to decrease burstiness (i.e., the instantaneous bandwidth must be as near as possible to the target bandwidth). FIG. 2 further shows a pictorial representation of some of the results of the Example. In the example:

(a) the application program is to send content with a target bandwidth $B_T$ of 15 Mbps.
(b) the machine on which the program is installed can reach a high precision time granularity of 100 milliseconds ($=t_w$).
(c) the application program will send UDP protocol packets on a network to one or many receiver devices (depending on what is specified by the user).
(d) the minimal data block $d_{min}$ size that can be handled is fixed as 177 Bytes.

Solution:

UDP protocol packets header is 28 Bytes (20 bytes for IP and 8 bytes for UDP).

The maximum size of UDP protocol packets is 65535 Bytes.

The input parameters are summarized as:

$B_T$=15 Mbps=15000000 bps=1875000 Bytes per second (1 byte=8 bits)

$t_w$=100 milliseconds=0.1 seconds $d_{min}$=177 Bytes ppsize=65535 Bytes overhead_size=28 Bytes Following the process described above:
1. $P_{theoretical} = 1875000 * 0.1 = 187500$ Bytes
2. $a = 187500/177 = 1059.322$
3. $b = 1059$
4. $c = 1060$
5. $P_{min} = 1059 * 177 = 187443$ Bytes
6. $P_{max} = 1060 * 177 = 187620$ Bytes
7. $m = 187500 - 187443 = 57$
8. $n = 187620 - 187500 = 120$
9. m<n: there will be a majority of packets with packet size $P_{min}$
10. n/m is already reduced to the lowest common integer multiple: p=57, q=120
11. cycle_packets = 57+120 = 177
12. A cycle will be composed of 177 packets, with 120 packets of packet size 187443 Bytes and 57 packets of packet size 187620 Bytes.
13. q>p, therefore z=q/p=2.105263
14. prop=2
15. q>p, therefore r=6
16. In a cycle, the packets will be sent in the following sequence:
    Repeat 57 times:
        send 2 packets with packet size 187443 Bytes ($P_{min}$)
        send 1 packet with packet size 187620 Bytes ($P_{max}$)
    then send 6 packets with packet size 187620 Bytes. ($P_{max}$)

Protocol Packets Composition:
1. v1=2.8629, v2=2.8602
2. v3=2
3. v4=2
4. maxrest=56550 Bytes
5. minrest=56373 Bytes
6. A packet of size 187620 Bytes will se split into:
    2 UDP packets of size 65535 Bytes, and
    1 UDP packet of size 56550 Bytes
7. A packet of size 187443 Bytes will be split into:
    2 UDP packets of size 65535 Bytes, and
    1 UDP packet of size 56373 Bytes
8. For the packet of size 187620 Bytes, the actual content data are 187536 Bytes (≈99.95523% of the packet size).
9. For the packet of size 187443 Bytes, the actual content data are 187359 Bytes (≈99.95519% of the packet size).

Figure 3:
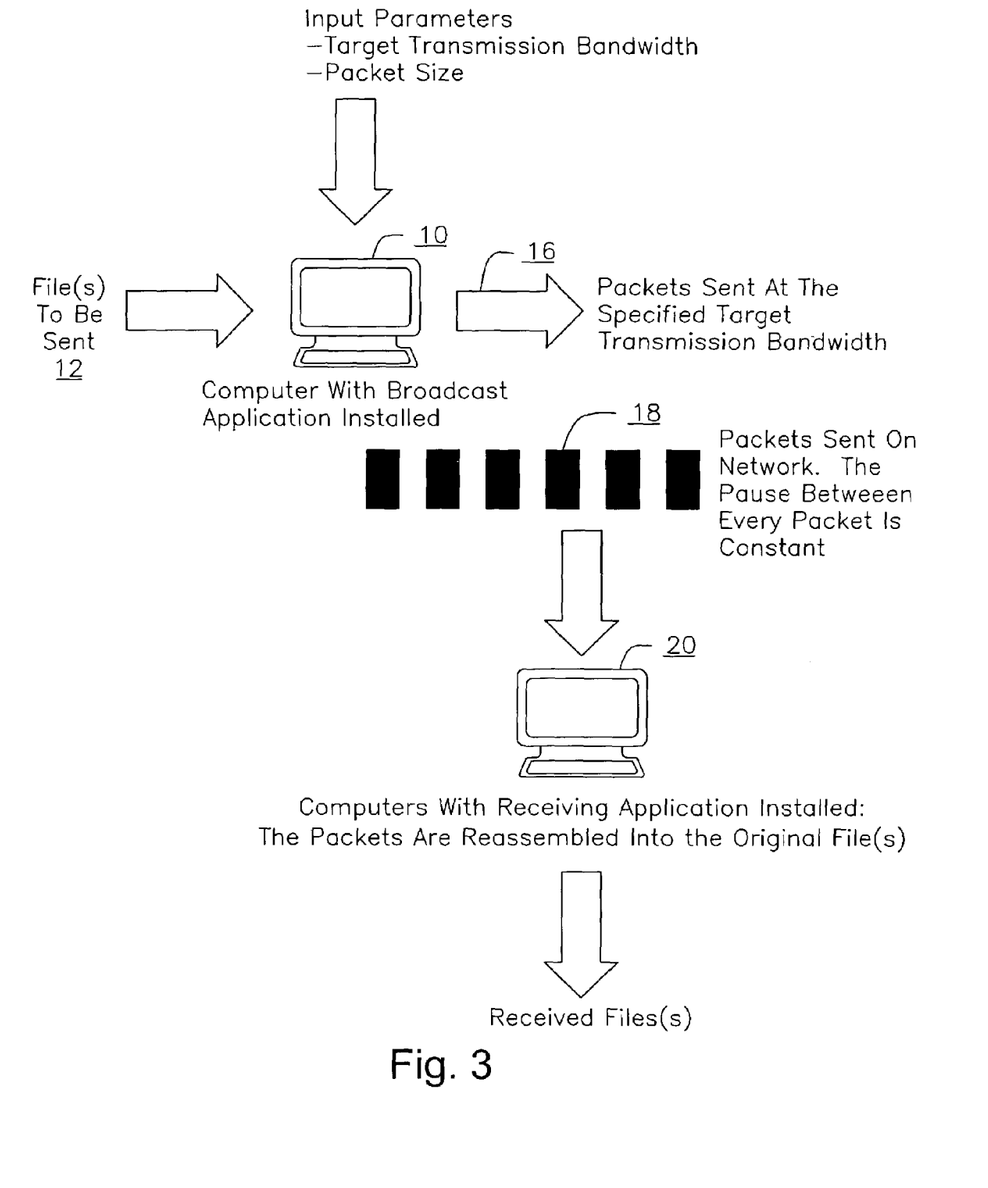
FIG. 3 is a schematic diagram showing a typical transmission and receiving system.

FIG. 3 is a diagram that explains the transmission of the data packets. At the sending station there is a computer 10 that has a broadcast application program installed. The broadcast application program operates on a content 12 that is to be transmitted in data packets. The parameters of the transmission target bandwidth $B_T$, p, and wait time $t_w$ are input to the computer 10, as explained above. The computer computes the packet sizes as described with respect to FIGS. 1A-1D and operates to control the transmission 16 of packets 18 (black bars), shown as having varying sizes.

The packets 18 are received at a computer 20 that has a receiving application program installed. This program reassembles the received packets into a file that corresponds to the content file 12 that was sent. This is conventional.

Specific features of the invention are shown in one or more of the drawings for convenience only, as each feature may be combined with other features in accordance with the invention. Alternative embodiments will be recognized by those skilled in the art and are intended to be included within the scope of the claims.

I claim:

1. A method for controlling the bandwidth of transmission of data content in cycles of successive data packets comprising the steps of:
    selecting a target bandwidth ($B_T$) for the transmission of data;
    determining a number of data packets of different sizes to be transmitted during a cycle with a fixed wait time ($t_w$) therebetween by calculating minimum ($P_{min}$) and maximum ($P_{max}$) of packet size values based on a theoretical packet size $P_{theoretical}$ value that is equal to the target bandwidth ($B_T$) times the wait time ($t_w$); and
    transmitting said packets of different size with said wait time ($t_w$) between each successive packet.

2. The method as claimed in claim 1 wherein said packets of different size include at least one packet of another size than the minimum size ($P_{min}$) and the maximum size ($P_{max}$) for completing the data content of the cycle.

3. The method as claimed in claim 1 wherein the minimum value packet size ($P_{min}$) corresponds to the value of $$\frac{P_{theoretical}}{d_{min}}$$

rounded down to the next integer value where $d_{min}$ is the minimum data block size that can be handled for transmitting said packets of different size.

4. The method as claimed in claim 3 wherein the maximum value packet size ($P_{max}$) corresponds to the value of $$\frac{P_{theoretical}}{d_{min}}$$

rounded up to the next integer value.

5. The method as claimed in claim 4 further comprising the steps of:
    computing values of m=$P_{theoretical}$-$P_{min}$ and n=$P_{max}$-$P_{theoretical}$; and
    determining the relationship of m to n as an indication of whether there are more or less packets of the minimum size ($P_{min}$) as compared to packets of the maximum size ($P_{max}$).

6. The method as claimed in claim 5 further comprising the steps of calculating the value of $$\frac{n}{m} = \frac{q*x}{p*x}$$

to determine whether in the cycle there will be a number of q packets of the minimum size ($P_{min}$) and p packets of the maximum size ($P_{max}$).

7. The method as claimed in claim 6 further comprising the step of computing from the value p and q a value r corresponding to an amount of said packets of different size to be transmitted to complete the cycle.

8. The method as claimed in claim 7 further comprising the step of calculating from the values p, q and r the number of cycles needed to completely transmit the data.

9. A computer-readable storage medium whose contents cause a computing system to perform a method for controlling the bandwidth of transmission of data content in cycles of successive data packets, comprising:

selecting a target bandwidth ($B_T$) for the transmission of data;

determining a number of packets of different sizes to be transmitted during a cycle with a fixed wait time ($t_w$) therebetween, wherein said packets of different size are packets of each of a minimum size ($P_{min}$) and maximum size ($P_{max}$); and transmitting said packets of different size with said wait time ($t_w$) between each successive packet and in accordance with a data protocol in which a number of protocol packets of a given size (ppsize) compose each data packet of the minimum size ($P_{min}$) and the maximum size ($P_{max}$) and computing values of $$V_1 = \frac{P_{max}}{ppsize} \text{ and } V_2 = \frac{P_{min}}{ppsize}.$$

10. The computer-readable storage medium of claim 9, the method further comprising:

rounding down $V_1$ to a value $V_3$;

rounding up $V_3$ to a value $V_4$;

computing values of maxrest=($P_{max}-V_3$*ppsize) and min rest=($P_{min}-V_4$*ppsize);

splitting a data packet of size $P_{max}$ into $V_3$ protocol packets of size ppsize and an individual protocol packet of size max rest; and splitting a data packet of size $P_{min}$ into $V_4$ protocol packets of size ppsize and an individual protocol packet of size minrest.

11. A system for controlling the bandwidth of transmission of data content in cycles of successive data packets comprising:

a computer configured to receive parameters of a target bandwidth ($B_T$) for the transmission of data, wherein the computer is configured to determine and control the transmission of a number of packets of different sizes during a cycle with a fixed wait time ($t_w$) therebetween each packet to achieve transmission at the target bandwidth ($B_T$), and wherein said packets are each of a minimum size ($P_{min}$) and maximum size ($P_{max}$) and are based on a value of a theoretical packet size ($P_{theoretical}$) that is equal to the target bandwidth ($B_T$) times the wait time ($t_w$).

12. The system as claimed in claim 11 wherein the computer is further configured to determine and transmit at least one packet of another size than the minimum size ($P_{min}$) and the maximum size ($P_{max}$) for completing the data content of the cycle.

13. The system as claimed in claim 11 wherein the computer is further configured to compute the minimum value packet size ($P_{min}$) as the value of $$\frac{P_{theoretical}}{d_{min}}$$

rounded down to the next integer value.

14. The system as claimed in claim 13 wherein the computer is further configured to compute the maximum value packet size ($P_{max}$) as the value of $$\frac{P_{theoretical}}{d_{min}}$$

rounded up to the next integer value.

15. The system as claimed in claim 14 wherein said computer computes the values of m=$P_{theoretical}-P_{min}$ and n=$P_{max}-P_{theoretical}$; and determines the relationship of m to n as an indication of whether there are more or less packets of the minimum size ($P_{min}$) as compared to packets of the maximum size ($P_{max}$).

16. The system as claimed in claim 15 wherein said computer further calculates the value of $$\frac{n}{m} = \frac{q*x}{p*x}$$

to determine whether in the cycle there will be a number of q packets of the minimum size ($P_{min}$) and p packets of the maximum size ($P_{max}$).

17. The system as claimed in claim 16 wherein said computer computes from the value p and q a value r corresponding to the number of data packets to be transmitted to complete at least one cycle.

18. The system as claimed in claim 17 wherein said computer further computes from the values p, q and r the number of cycles needed to completely transmit the data.

19. The system as claimed in claim 11 wherein said computer is further configured to compute and transmit the data in accordance with a data protocol in which a number of protocol packets of a given size (ppsize) compose each data packet of the minimum size ($P_{min}$) and the maximum size ($P_{max}$) and computes values of $$V_1 = \frac{P_{max}}{ppsize} \text{ and } V_2 = \frac{P_{min}}{ppsize}.$$

20. The system as claimed in claim 19 wherein said computer is further configured to:

round down $V_1$ to a value $V_3$;

round up $V_3$ to a value $V_4$;

compute values of maxrest=($P_{max}-V_3$*ppsize) and min rest=($P_{min}-V_4$*ppsize); and split a data packet of size $P_{max}$ into $V_3$ protocol packets of size ppsize and an individual protocol packet of size max rest; and split a data packet of size $P_{min}$ into $V_4$ protocol packets of size ppsize and an individual protocol packet of size minrest.

* * * * *